UNITED STATES PATENT OFFICE.

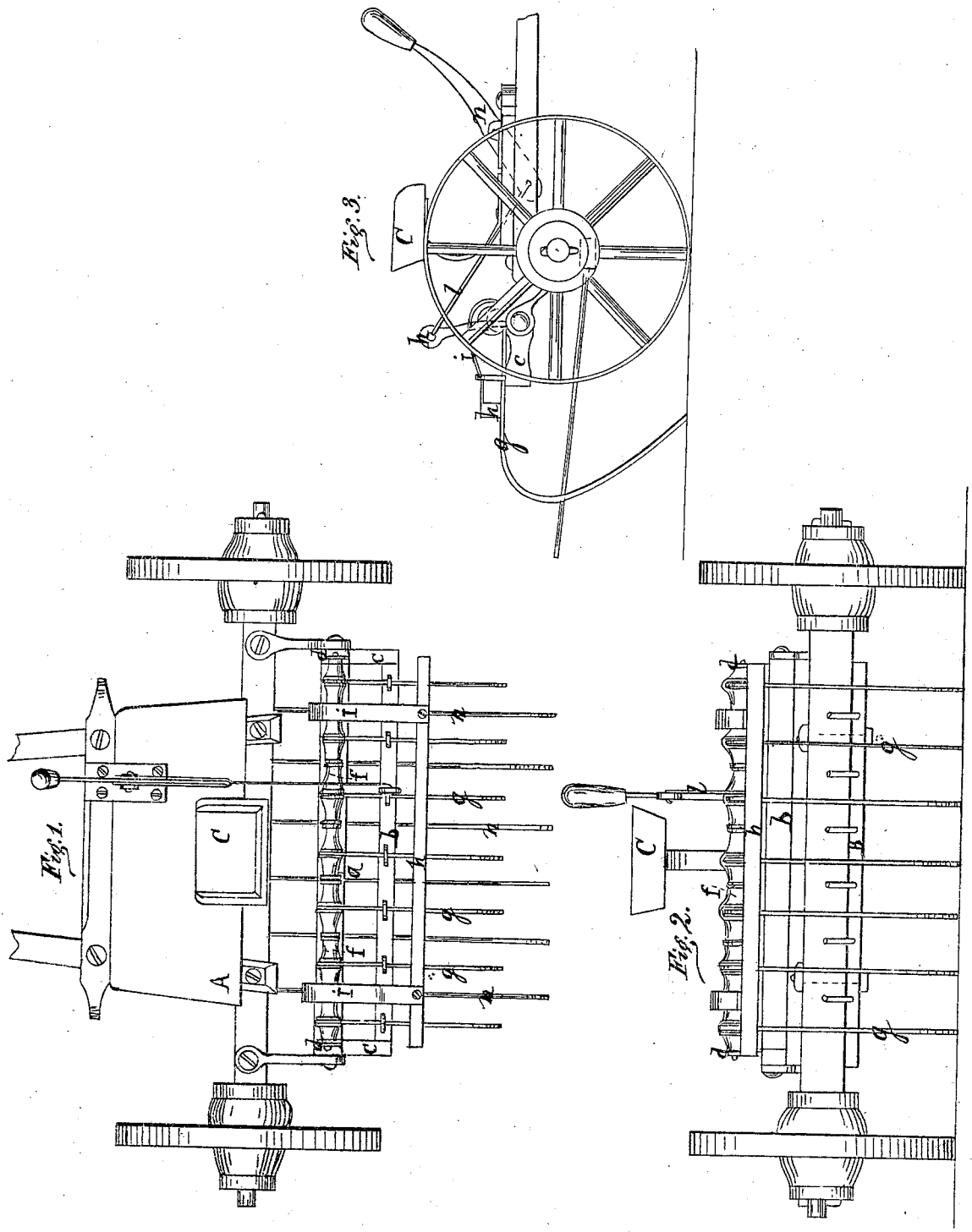

FREDK. SEIDLE AND SAML. EBERLY, OF MECHANICSBURG, PENNSYLVANIA.

IMPROVEMENT IN HORSE-RAKES.

Specification forming part of Letters Patent No. 29,012, dated July 3, 1860.

*To all whom it may concern:*

Be it known that we, FREDK. SEIDLE and SAML. EBERLY, of Mechanicsburg, Cumberland county, State of Pennsylvania, have invented certain new and useful Improvements in Horse-Rakes, of which the following is a full, clear, and exact description, reference being had to the accompanying drawings, forming part of this specification, in which—

Figure 1 represents a plan of a horse-rake embracing our improvements. Fig. 2 represents a rear elevation of the same.

Our improvements in horse-rakes relate to that class in which the rake is attached to a two-wheel carriage with the teeth resting on a rocking frame, and with clearers arranged between the teeth for the purpose of discharging the material raked from the teeth as they are raised.

Our invention consists in arranging the pressure-bar extending across the teeth to hold them down back of the rear bar of the rocking frame in order to bring it more nearly over the points of the teeth for the purpose of giving increased support and steadiness to the teeth.

In the accompanying drawings a horse-rake embracing our improvements is represented, which consists of a rocking frame composed of two side bars, $a$ and $b$, arranged parallel to each other, at a proper distance apart, united by cast-iron heads $c$, rising from the end pieces. Over the front bar, $a$, of the frame are ears $d$, and through these ears a rod passes, on which the blocks $f$, forming the heads of the rake-teeth, are strung. The rake-teeth $g$ are wound around and firmly attached to the head-blocks, and extend backward and rest on the rear bar of the rocking frame, passing between guides or loops driven into the rear bar to hold them from springing laterally.

Resting on the rake-teeth, back of the rear bar, is a pressure-bar, $n$, the springs $i$ of which are of the C form, and confined at one end to the front bar of the rocking frame and at the other to the pressure-bar. These springs hold the bar down, causing it to press on the rake-teeth and hold them in contact with the rear bar of the rocking frame, but allowing them to rise by the yielding of the bar and pass over obstacles.

The rocking frame and rake are supported on a two-wheel carriage, A, to which they are pivoted, turning on centers in line with the front bar of the rocking frame. A lever, $k$, rises from the front bar of the rocking frame, which is connected by a link, $l$, with a shipping-lever, $n$, by which the rake is raised when not in use, or in discharging the hay raked up. On the under side of the axle, and connected with it by the same bolts that attach the shafts to the axle, is a stripper, B, the teeth $m$ of which extend and pass between the rake-teeth.

A driver's seat, C, is arranged on the carriage in front of the axle, and in such position as to nearly balance the weight of the rocking frame and rake.

In arranging the spring pressure-bar to bear on the rake-teeth back of the rear bar of the rocking frame on which the teeth rest, longer and more elastic springs may be applied to the pressure-bar, and the pressure-bar is brought more nearly over the point of the teeth in front of the rear supporting-bar, by which means the teeth are more fully supported, and their liability to bend or break is materially diminished.

In arranging the rake-clearer beneath the axle of the carriage and confining it to the axle by the same bolts which hold the shafts the expense of its attachment is diminished, and, besides, it can be removed with the greatest facility for repair or other purpose.

Having thus described our improvements in horse-rakes, what we claim therein as new, and desire to secure by Letters Patent, is—

The combination of a rocking frame supporting the rake with a spring pressure-bar extending across the rake-teeth and bearing upon them back of their rear support on the frame.

In testimony whereof we have subscribed our names.

FREDRICK SEIDLE.
SAMUEL EBERLY.

Witnesses:
B. C. PAINTER,
JOSEPH LEAS.